United States Patent [19]

Melman

[11] Patent Number: 4,638,355

[45] Date of Patent: Jan. 20, 1987

[54] SYSTEM AND METHODS FOR IMPROVING VIDEO CAMERA PERFORMANCE

[75] Inventor: Haim Melman, Hertzlia, Israel

[73] Assignee: Elscint Ltd., Haifa, Israel

[21] Appl. No.: 675,436

[22] Filed: Nov. 27, 1984

[51] Int. Cl.[4] .......................... H05G 1/64; H04N 5/32

[52] U.S. Cl. .................................... 358/111; 358/110; 378/99

[58] Field of Search ............... 358/111, 110, 211, 217, 358/219; 378/99, 100

[56] References Cited

U.S. PATENT DOCUMENTS 3,955,116 5/1976 van den Berg ..................... 358/219

4,482,918 11/1984 Keyes et al. .......................... 378/99

*Primary Examiner*—Craig E. Church
*Assistant Examiner*—Charles Wieland
*Attorney, Agent, or Firm*—Sandler & Greenblum

[57] ABSTRACT

A system for improving the performance of video cameras used in Digital Subtraction Angiography wherein the cameras have tubes comprising targets with elements in said target that correspond to pixels of an image. The method basically comprises the step of defocusing the electron beam especially during the scrubbing operation so that the electron beam impinges on more than one element at a time.

8 Claims, 6 Drawing Figures

SYSTEM AND METHODS FOR IMPROVING VIDEO CAMERA PERFORMANCE

FIELD OF THE INVENTION

This invention is concerned with TV camera tubes and more particularly with such camera tubes which are used in medical imaging systems.

BACKGROUND OF THE INVENTION

Basically TV cameras includes a pick-up tube that is a transducer which converts optical images (spatial variations in brightness) into electrical signals (temporal variations in current). The signals are amplified and processed by the camera circuitry to provide video signals that can be displayed by a monitor, recorded on a magnetic tape or transmitted by a broadcast TV transmitter, for example. The invention is concerned with methods of improving the operation of the camera tube.

Camera tubes have three basic functions:

a. photo-detection i.e. converting light images into electrical charges used to discharge the storage on the dielectric target of camera tubes;

b. charge storage i.e., charging the dielectric target; and c. signal read-out; i.e., reading out the dischaged portions of the dielectric target.

Signal read out is accomplished by using an electron beam which scans the target in a video manner to analyze the changes in the electrical charges occuring between successive beam scans. The electron beam charges the target and thus each scan restores the target to a charged state wherein the beam side of the target is at the tubes cathode potential (Vc) and the window side of the target is at another potential (Vw) so that there is a potential difference (Vwc) across the target dielectric. Photons striking the target discharge the target, decreasing the potential difference across the target. When the electron beam strikes discharged sections of the target, electrons flow from the beam to the target inducing current to flow from the potential (Vc) through a load resistor to the window side of the target. This current flowing through the resistor is the output current i.e. the output signal of the TV tube.

Thus the optical image is placed on the camera by the photons which discharge target elements. The analog amount of the discharge is detected by the electron beam sweeping the target elements to recharge the elements. Ideally as the illumination (brightness) changes the discharge of the target element should change linearly and proportionally. However, there is a time lag between the change in the illumination and the change in TV tube output signal. This time lag occurs both when decreasing and when increasing the target illumination and is known as "lag". In the light intensity decreasing phase it is known as "decay lag" and in the light intensity increasing phase it is known as "build-up lag".

In many operations, the TV tube lag is insignificant to the output of the tube; however, in medical imaging operations and especially in medical imaging using DSA (i.e. Digital Substration Angiography) the lag causes significant problems. The decay lag causes instantaneous data for constructing real time images to be mixed with the data of prior acquired images; i.e., preent images include the data of the previous images. The build up lag degrades the value of the first few acquired images to the point where they cannot be used in the DSA technique. The lag problem is aggravated in DSA because of the light pulsing mode used in the DSA operations.

Present DSA systems attempt to overcome the lag problem by either using light biasing or by increasing the number of target scrubs. It has been found that the lag decreases as the light bias increases and as the number of scrubs increases. It has further been found that all of these methods are cumulative.

The lag is effected by the storage capacitance of the target element; which is in effect a photoconductor, and by the resistance of the scanning beam at low signal level. The decay of the signal is affected by the RC time constant of these equivalent capacitances and resistances. For practical purposes there is no video signal (neglecting dark current) when the photo conductor face is fully charged since in that condition there is no beam electron deposition onto the photoconductor face.

It is desirable in DSA techniques that all acquired images of the non-time dependent objects are as identical to each other as possible. The lag or the RC decay effects cause the image data during the first few images to vary considerably. This characteristic is a problem unique to the DSA acquisition technique. In the DSA technique, before the first X-ray pulse, the electron beam scans the target for a relatively long time period (i.e. the time period necessary, for example, to accomplish a plurality of frame scans). The pre X-ray multiple scans are done in darkness and result in fully charging the photocoductor face; i.e. the target is saturated. The saturation occurs since the cumulative time used for the pre X-ray scan is much greater than the RC time constant of the TV tube; that is, the time constant due to the equivalent resistance-capacitance of the target.

The X-ray pulse is applied after saturation. The X-ray energy is transformed into visible light pulses and results in the generation of a number of electron hole pairs. The electron hole pairs discharge the photoconductor face of the target. During the discharge time the electron beam is blanked.

Subsequently, a progressive scan is used to read out the information electrostatically stored. The inherent RC characteristic causes lag to occur in the charging of the dielectric faces. This lag as previously noted varies the information of the first few frames and thus makes them impossible to use. Similarly, the data obtained by the scanning beam is erroneous due to the lag, since this data includes prior acquired data along with the newly acquired data.

In the prior art, attempts have been made to correct for the errors occurring when the image data and residual image data are combined and due to build-up degradation. These attempts comprise either using light biasing arrangements or increasing the number of scrubs of the target photo- conductor face. Lag decreases as the light bias increases and as the number of scrubs increase. Both procedures, i.e. scrubbing and biasing, require extra time or equipment. A well done scrubbing, in particular, requires many scrub periods and results in a long image time interval which is unacceptable in usual DSA procedures. Therefore new and improved methods and systems of overcoming the lag problem are desired, especially for use in DSA systems.

BRIEF DESCRIPTION OF THE INVENTION

Accordingly, a method for improving the performance of TV cameras used in digital subtraction angiography (DSa) systems, is provided where such cameras comprise a target, having elemental areas; said target further having a target load resistance, said method comprising the steps of:

charging the target with an electron beam that scans a field areas of said target during a field scan period, said electron beam normally focused to encompass a single elemental area blanking said electron beam during a discharge period, exposing said target elemental areas to photons during said discharge period, thereby discharging certain of said target elemental areas, recharging said target elemental areas during a read period to generate a signal current further recharging said target elemental areas with said electron bean during a scrub period and defocusing said electron beam to encompass a plurality of said target elemental areas during said scrub period.

A main feature of the invention provides for using a single scrub period only and a de-focusing procedure whereby the electron beam covers a plurality of target elemental areas each equivalent to a pixel element.

A feature of the inventionis the de-focusing of the beam by varying a grid voltage.

Yet another feature of the invention defocuses the beam by changing the current of the focusing coil to thereby inhibit stability problems which may otherwise occur after defocussing. The defocusing is preferably accomplished during the scrub time.

A generalized feature of the present invention is to provide methods and means for counteracting the normal RC effects present when discharging and recharging the dielectric elements in TV camera tube targets.

BRIEF DESCRIPTION OF THE DRAWINGS

The above named and other objects and features of the present invention will be better understood when considered in the light of the following description of a broad aspect of the invention taken in conjunction with the accompanying drawings, wherein.

GENERAL DESCRIPTION

Figure 1:
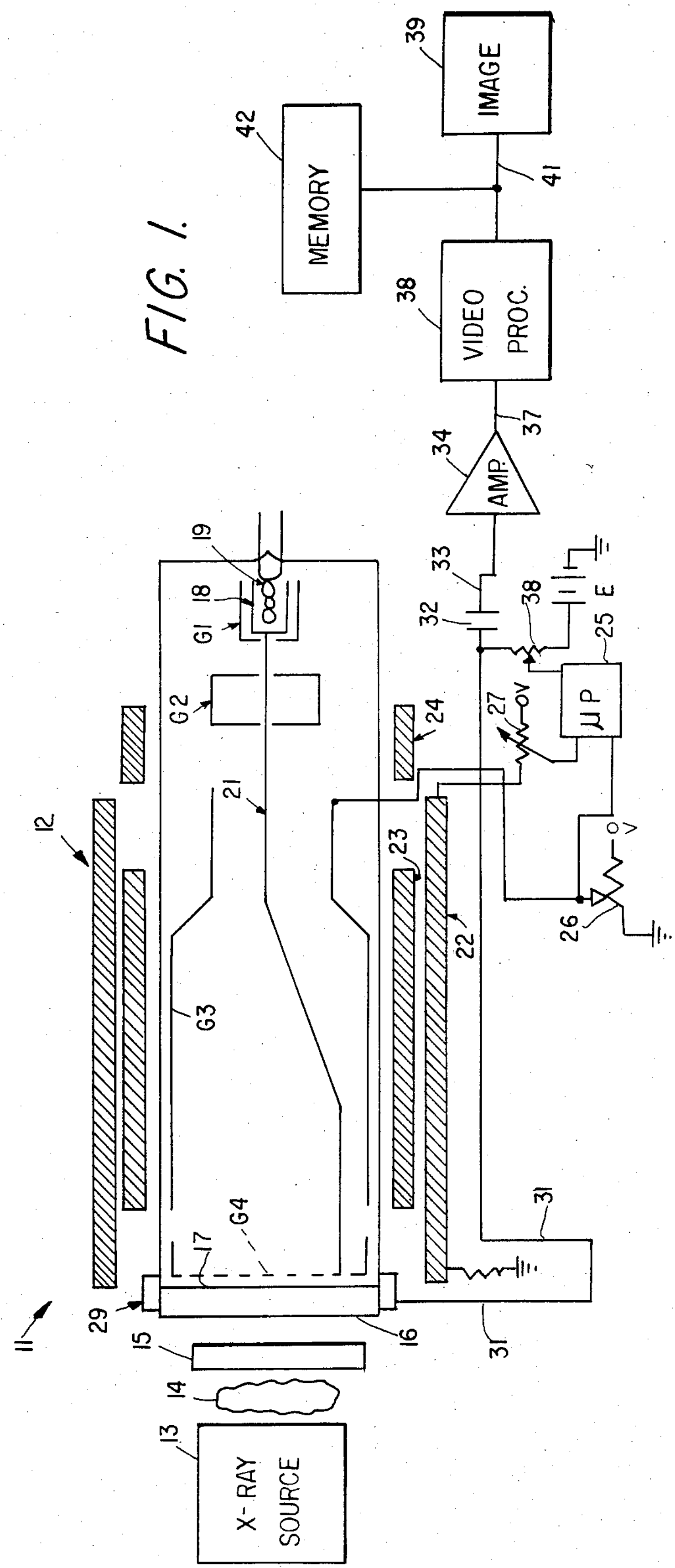
FIG. 1 shows a block diagram of an exemplary camera tube system.

The TV camera arrangement 11 of FIG. 1 includes the actual camera tube shown generally at 12. The camera tube is set up to detect light photons coming from an image intensifier, stimulated by rays from X-ray source 13. The X-rays pass through a subject 14 and onto scintillator means 15. The scintillator means provides photons responsive to the X-rays. The photons strike the camera face 16. The inside of the camera face 17 comprises a target such as a thin photo-conductor layer, preceeded by a transparent conductive layer. The remainder of the tube structure provides a focused low energy electron beam to scan the information present in the form of the potential distribution on the beam side of the target. The potential distribution is varied in accordance with the scene that has been imaged on the face of the tube.

The tube structure comprises cathode 18 surrounded by a beam current control grid G1. The cathode may include a heater shown at 19. An acceleration electrode G2 accelerates the electons coming from the cathode due to a voltage difference between grid G2 and the cathode. The electron beam is indicated by the line 21. Immediately prior to the photo-conductive layer is a field grid G4. Surrounding the tube is a focus coil 22. Within the focus coil, also surrounding the tube, is a deflection coil 23. Within the tube proximate to the inner walls thereof is wall electrode G3. An alignment coil 24 is provided starting proximate to the end of the electron gun and extending the face of the tube.

Normally the electron beam is focused, as previously mentioned, so as to impinge on an elemental area of the target photo-conductive layer that is related on a one-to-one basis to the picture elements (pixels) on the display imaging device. The beam herein is defocused so that it impinges on a multiplicity of such elements especially during the scrub. The defocussing means are shown by way of example, as variable resisters 26 and 27 operated under the control of microprocessor 25 for varying the current through the focusing coil 22 and/or varying a voltage on the grid G3. The intensity of the beam can also be varied at this point under the control of the microprocessor by using variable resistance 28 for the load resistor RL.

The output of the target is obtained from the target ring 29 and is coupled through conductor 31, capacitor 32, and conductor 33 to amplifier means 34. Amplifier means 34 is connected through conductor 37 to video processor 38. The processor is used for processing the output of the amplifier to provide data for creating display images on imaging means 39 connected to the processor over conductor 41. Image memory means 42 are also shown connected between the processor and the imaging means so that the image may be stored in the memory or the memory may be used during the processing of the imaging data.

Initially, the target is charged by the electron beam which scans the photo-conductor for a long time period in darkness prior to operation.

Figure 2:
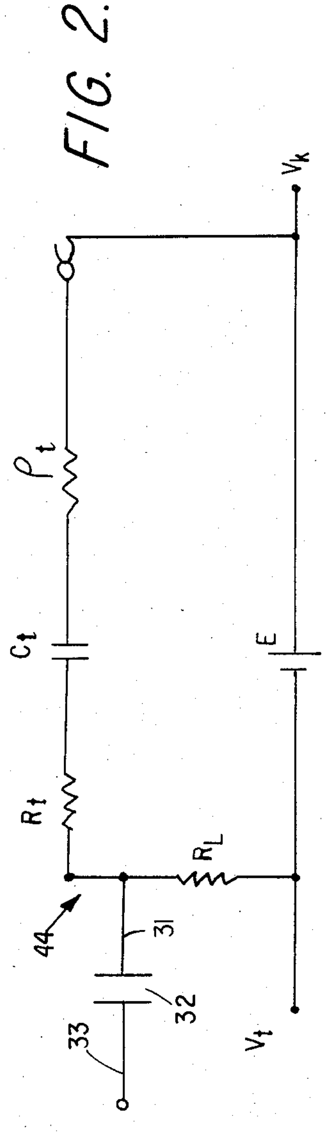
FIG. 2 is an equivalent circuit of the TV camera pick-up tube.

This results in a saturation charge of the photo conductors, since the time period is longer than the RC constant computed from the elements shown in FIG. 2. Therein Rt is the resistence through the target from one side of the target to the other $\rho t$ is the equivalent beam resistence i.e. resistivity of the beam and RL is the setting of resistor 28. The capacitor 32 couples conductor 31 to conductor 33, as in FIG. 1.

Figure 3:
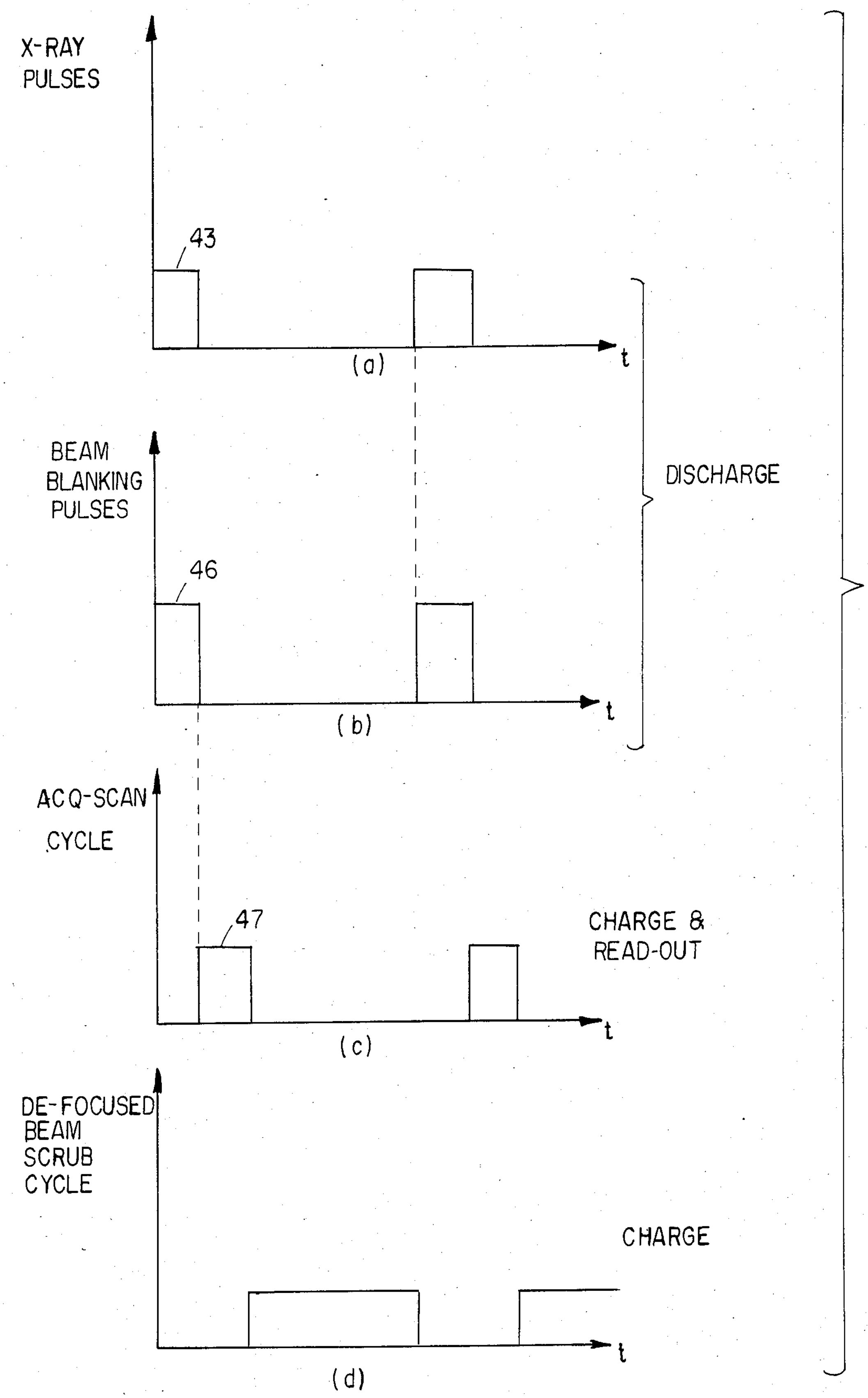
FIG. 3 *a, b, c* and d graphically show X-ray pulses, blanking pulses, acquisition scanning timing pulses and the defocused scrub pulses, respectively.

The first X-ray pulse shown in FIG. 3 results in the generation of a related number of electron-hole pairs. In turn the electron-hole pairs result in a discharge of the target photo-conductor proportionaly to the pairs and located in accordance with the electron-hole pairs. During the time of the X-ray pulse, the electron beam is blanked. This is shown at FIG. 3*b*. After the blanking, the beam is focused on each pixel for approximately 80 nanoseconds during the scanning process. The beam impinging on the pixel recharges those pixels which have been discharged. However, the recharging occurs at a decreasing rate. See FIG. 4, which shows the "element charge" Vs. "time" in nanoseconds. The recharging time decreases as the charge increases.

Figure 4:
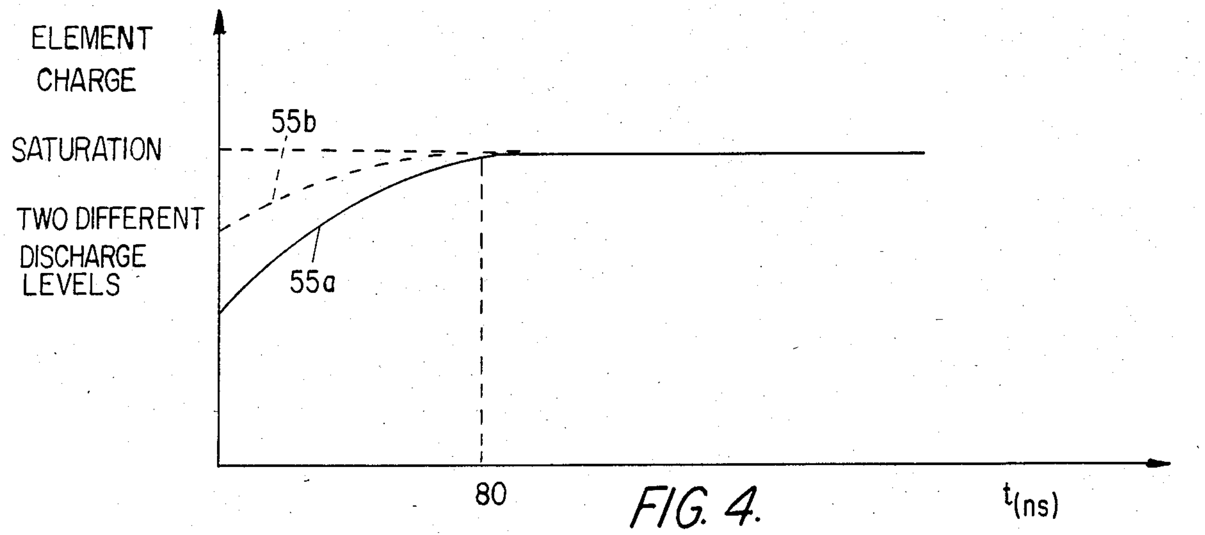
FIG. 4 is a typical RC characteristic of the dielectric element of the camera tube, while being charged.
Figure 5A:
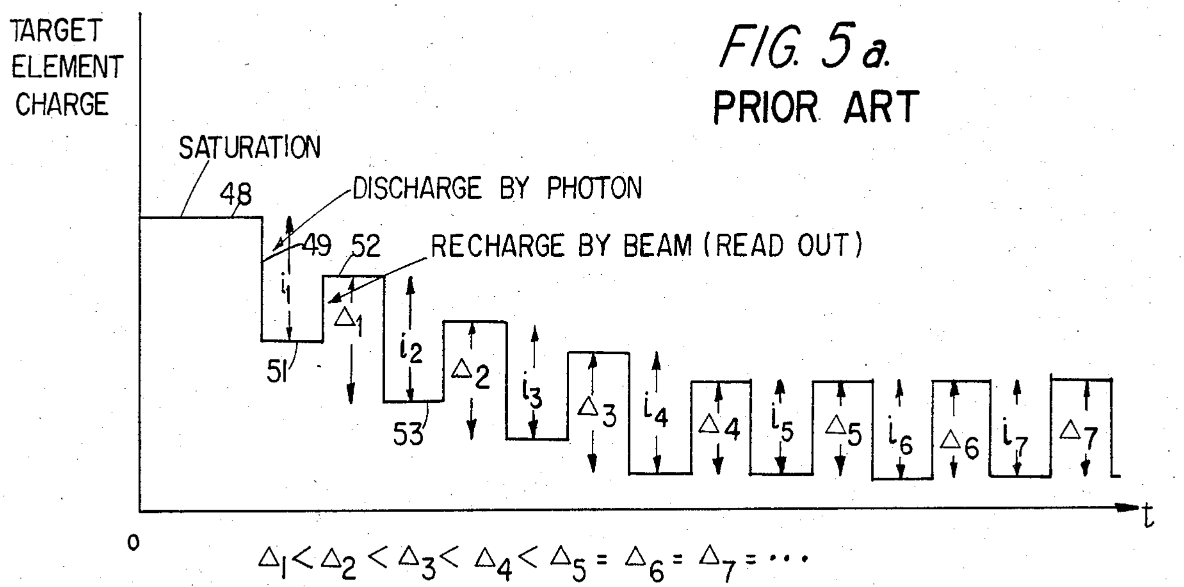
FIG. 5*a* is an operational charge-discharge characteristic of the dielectric element of the camera tube according to the prior art.

The target element charge time dependence is shown in FIG. 5, which illustrates the changes in element charge due to the charge characteristic shown in FIG. 4 and the pulses provided as shown in FIG. 3. The second X-ray pulse results in the same amount of electrons discharged from the photo-conductor as did the first X-ray pulse. However, since prior to the second X-ray pulse the element was not fully charged, the second X-ray pulse results in an element carrying less charge than in the previous period. Note the difference in the charge value Δ1 between portion 51 and portion 53 in the graph of FIG. 5*a*.

The first X-ray pulse located at 43 (FIG. 3*a*) results in the generation of a number of electron-hole pairs as function of the intensity and duration of the light photons. The photons indicated in FIG. 2 at 44 discharge capacitance Ct through resistance Rt. During the first X-ray pulse, a beam blanking pulse 46 is applied as shown in FIG. 3*b*. After the blanking, the scan cycle occurs when a first acquisition beam scans the target. During the scan cycle time defined by pulse 47 the photo-conductor is scanned in a TV scanning mode.

The beam striking the discharged elements generally recharge those elements along the curve of FIG. 4, which shows the general element charging characteristic. A fully charged element is shown at 48 in FIG. 5*a*. It is discharged along line 49 to the discharge state 51 by photons. The scan beam charges the elements to the charge state shown at 52 following along the charge characteristics of FIG. 4. The second X-ray pulse discharges the same amount of electrons from the photoconductor as the first X-ray pulse. However, since prior to the second X-ray pulse, the element was not fully charged, the discharge level shown as 53 is lower than the level of 51. This is readily understandable since the charge height 52 is less than that of 48. Therefore the element is discharged to a lower level at 53 than at 51. The element is thus at a lower point of the element charging time dependence of FIG. 4, which results in a faster transfer of electrons from the beam to the photoconductor. Note the difference in the slope of curve portions 55*a* and 55*b* in FIG. 4. This illustrates the two different charge levels. Therefore within the 80 milisecond time interval more charge is transferred to the element on the second period than in the first one. Thus a higher signal is obtained in the second frame.

To overcome this variance in the actual output signal, the prior art provides for multiple scrub periods between images. The multiple scrub periods result in fully recharging the pixel by repetitions of the 80 nanosecond recharging period. The repeated scrubs maintain the charging of the element close to the saturation point of the element charging curve. However, the multiplicity of scrubs result in longer imaging time intervals. In DSA this is unacceptable. Accordingly the present DSA systems use only one scrub for each scanned image and thus obtain 10 images per second. One scrub normally only minimally reduces the RC effect.

Figure 5B:
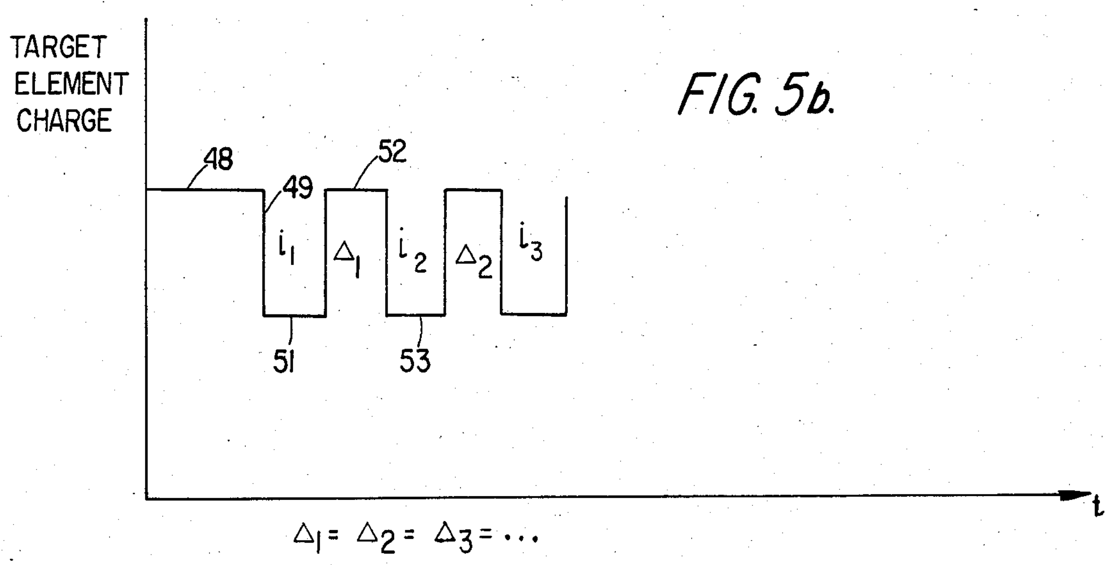
FIG. 5*b* is the operational charge-discharge characteristic of the dielectric element of the camera tube according to the present invention.

Means are provided, according to the present invention, for increasing the efficiency of the one scrub period, whereby the one scrub period has the efficiency of practically an infinite number of scrub periods. More particularly means are provided for defocusing the beam so that the beam rather than being focused on a single element at a time is focused on a multiplicity of elements simultaneously. The focus of the beam can be depicted as a rectangle of the same size as each element in the regular scrub and therefore each element is subjected to electron flow for a mere 80 nanoseconds. When the beam is defocused then the beam covers a large area. In a preferred embodiment, the area covered is equivalent to 100–400 pixels or more. The increased focal spot area may be accompanied by higher current in the electron beam. Instead of subjecting each element to an electron flow time interval of 80 nanoseconds, the time interval is effectively increased to 8000–32000 nanoseconds or more. Thus, saturation is reached; and in fact, the operation of the system on the curve of FIG. 4 is at the saturation point. In FIG. 5*b* where the scanning beam is defocused, then the discharge section 53 is at the same level as section 51, showing that there is only one discharge level.

In operation the defocusing is achieved on the camera tube by adjusting the voltage on the wall electrode G3 as shown in FIG. 1 through the operation of variable resister 26 for example, or in addition, or alternatively the current of the focusing coil 22 is varied by varying resister 27, in series with the focusing coil. The time interval of the beam blanking enables the stabilization of transient charges in the coil current.

The reading out of frame data in the TV tube is accompanied by photoconductor charging. Ideally the read-out scan should fully recharge the photo conductor in order to be sure there is no residual data. The defocusing assures that the operation of the system is near the saturation point on the elemental charge characteristics. Thus, a single scrub period is as efficient as many succesive scrubs without the defocusing.

While the invention has been described with reference to a certain preferred embodiment it should be understood that this explanation is made by way of example only and not as a limitation on the scope of the invention.

What is claimed is:

1. A method for improving the performance of TV cameras used in digital subtraction angiography systems, said cameras having tubes comprising a target with elemental areas in said target corresponding to pixels of the image, said tube also having a focus coil for focusing the electron beam thereof onto the elemental areas of said target, said method comprising the steps of:

a. charging the target with an electron beam that scans the target during a preliminary charge scan period of said electron beam;
b. said electron beam being normally focused on a single target elemental area;
c. blanking said electron beam during a discharge period caused by an exposure pulse of radiation;
d. exposing said target elemental areas to photons generated by said radiation during said discharge period such that certain of said target elemental areas are discharged;
e. acquiring data by recharging said certain of said target elemental areas during a reading scan of a target area comprising a plurality of lines;
f. further recharging said target elemental areas in said target area during a scrub period prior to the next beam blanking period; and
g. defocusing said electron beam during said scrub period to cause said electron beam to encompass a plurality of said elemental areas during said scrub period.

2. The method of claim 1 wherein said step of defocusing includes biasing said focus coil to cause said electron beam to simultaneously strike a plurality of said target elemental areas.

3. The method of claim 1 wherein said step of defocusing includes biasing a wall electrode to cause said electron beam to simultaneously strike a plurality of said target elemental areas.

4. The method of claim 1 wherein by the step of defocusing said electron beam encompasses more than a single target elemental area.

5. The method of claim 4 including the step of intensifying said defocused electron beam.

6. A system for improving the performance of TV cameras in digital subtraction angiography, said cameras having tubes comprising target means, elemental areas in said target means which correspond to pixels of an image; said system comprising:

a. X-ray source means for providing pulses of rays;

b. scintillation means for providing light photons responsive to being impinged by said X-rays;

c. means for scanning the target means with an electron beam to charge the target elemental areas in an area comprising a plurality of lines of elemental areas during a preliminary scan period;

d. means for discharging said target elemental areas responsive to said light photons striking said target elemental areas;

e. means for blanking said electron beam during said pulses of X-rays;

f. said discharging being a function of the intensity of the X-rays striking the scintillation means;

g. means for scanning the target means with an electron beam for recharging the discharged target elemental areas in said scanned area and generating a signal current, said scanning occuring during a read scan period;

h. means for scrubbing said target elemental areas during a single scrub scan period with said electron beam after said read scan period to recharge said elemental areas prior to the next X-ray pulse; and i. wall electrode means for defocusing said electron beam during said scrubbing so that the beam encompasses more than a single target element during the said scrubbing operation.

7. The system of claim 6 including means for intensifying said electron beam during said scrubbing operation.

8. The system of claim 4 wherein said means for defocusing said beam comprises focusing coil means, and means for varying the signal to said focusing coil means.

* * * * *